M. L. THOMPSON.
COOKING VESSEL.
APPLICATION FILED DEC. 9, 1920.
1,384,786.
Patented July 19, 1921.
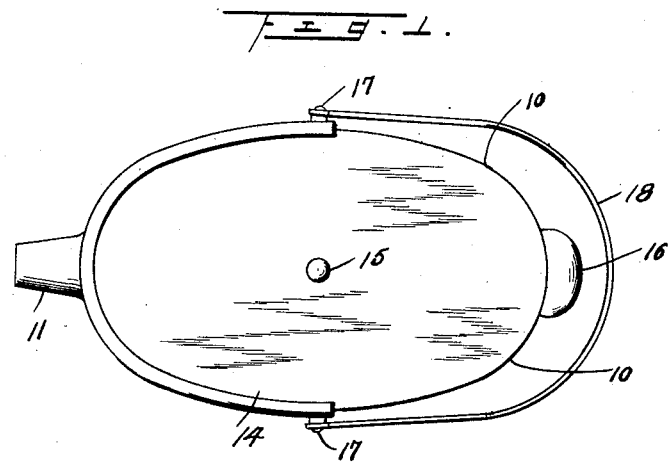
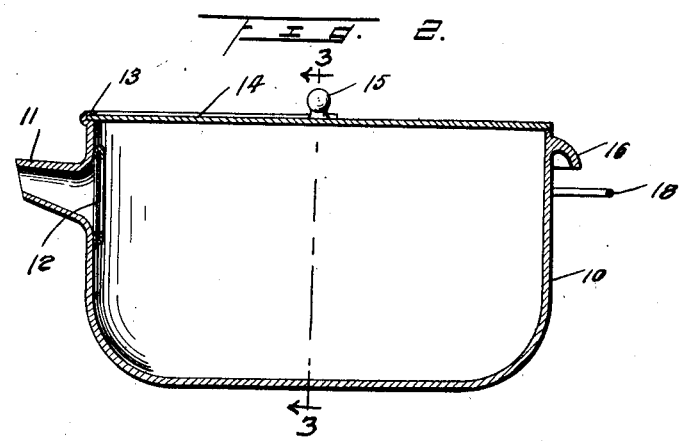
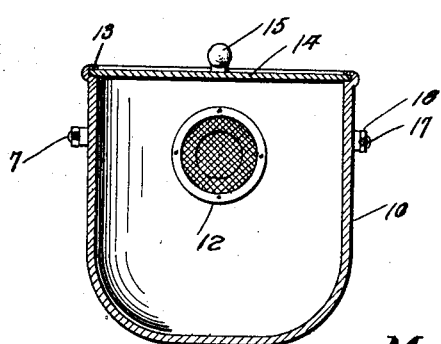
Inventor
M. L. Thompson

UNITED STATES PATENT OFFICE.

MABEL L. THOMPSON, OF NEW YORK, N. Y., ASSIGNOR OF ONE-HALF TO REBECCA WOODS, OF NEW YORK, N. Y.

COOKING VESSEL.

1,384,786.   Specification of Letters Patent.   Patented July 19, 1921.

Application filed December 9, 1920. Serial No. 429,439.

*To all whom it may concern:*

Be it known that I, MABEL L. THOMPSON, a citizen of the United States, residing at New York, in the county of New York and State of New York, have invented certain new and useful Improvements in Cooking Vessels; and I do hereby declare the following to be a full, clear, and exact description of the invention, such as will enable others skilled in the art to which it appertains to make and use the same.

The object of the invention is to provide a cooking utensil of the variety ordinarily referred to as a pot for use in boiling vegetables, meats and like foods whereby the water may be conveniently drained from the solid contents of the vessel without permitting the escape of the latter and without exposing the hands of the operator to the scalding effect of the steam, and also under conditions preventing the smaller particles of the solid contents from entering the spout or outlet provided for the water; and with these objects in view the invention consists in a construction and combination of parts of which a preferred embodiment is shown in the drawing, wherein Figure 1 is a top plan view of the cooking vessel.

Fig. 2 is a sectional view taken on a vertical plane extending centrally and longitudinally through the cooking vessel, and Fig. 3 is a sectional view taken on the vertical plane indicated by the line 3—3 of Fig. 2, looking in the direction indicated by the arrows.

The vessel 10 may be of any preferred or desired dimensions and shape to suit the purpose for which it is designed and it is provided in the side wall, preferably a short distance below the rim or upper edge thereof with an outlet spout 11, protected by a perforated screen 12 arranged in the plane of the surface of the wall in such a position as to permit of the unobstructed passage of the water or liquid contents of the vessel while restraining the solid particles and preventing the latter from entering and obstructing the passage through the spout or outlet.

At the upper edge of the wall of the vessel and extending continuously throughout the side and front portions thereof, over the outlet or spout, is a cover seat formed by an inwardly directed flange 13 designed for the reception of the edges of the cover 14 which is preferably provided with a knob 15 to facilitate the handling thereof. The cover must be applied to the vessel by a sliding movement substantially parallel with the upper edge or rim of the vessel to fit the edges thereof into the seat, and owing to the overhanging relation of the flange 13 the cover is thereby held in place, in snugly fitting relation with the upper edge or rim of the vessel even when the latter is tilted to completely discharge the liquid contents thereof through the outlet or spout.

At the rear end, or at the end opposite to the spout or outlet there is arranged a handle 16 adapted to be grasped by the operator in tilting the vessel, while connected with the side wall by pivots 17 axially disposed transversely of the vessel or perpendicular to a line connecting the spout or outlet with the handle 16 is a supporting or carrying bail 18 common to vessels of this type.

Owing to the fact that the upper edge or rim of the wall of the vessel at the rear end of the latter, adjacent to the handle 16, is unobstructed by the flange 13, or otherwise, the vegetables or other solid contents of the vessel, after the liquid has been drained therefrom, may be discharged without passing over the flange or the cover seat formed thereby, to avoid the possibility of the said solid contents catching upon the flange or becoming mutilated thereby, and in so tilting the vessel the projecting spout 11 constitutes a convenient grip by which the vessel may be tilted while the weight thereof is carried by means of the supporting bail 18, just as the tilting movement in the forward direction, to discharge the liquid contents is effected by manipulating the handle 16 while the vessel is supported by means of the bail. In either case the vessel is tilted upon the pivotal connection 17 of the bail with the side walls of the receptacle.

Having thus described the invention, what I claim is:—

1. A cooking vessel having a transverse pivotally connected supporting bail and, in diametrically opposite positions, an outlet and a handle arranged in a plane perpendicular to the axis of the supporting bail, the upper edge or rim of the vessel above the outlet and extending rearwardly at the sides of said rim being provided with a seat for the reception of the peripheral edge of a vessel cover.

2. A cooking vessel having a transverse pivotally connected supporting bail, and in diametrically opposite positions, an outlet and a handle arranged in a plane perpendicular to the axis of the supporting bail, the upper edge or rim of the vessel above the outlet and extending rearwardly at the sides of said rim being provided with a seat for the reception of the peripheral edge of a vessel cover, said seat being formed in the plane of the upper edge or rim of the vessel.

3. A cooking vessel having a transverse pivotally connected supporting bail, and in diametrically opposite positions, an outlet and a handle arranged in a plane perpendicular to the axis of the supporting bail, the upper edge or rim of the vessel above the outlet and extending rearwardly at the sides of said rim being provided with a seat for the reception of the peripheral edge of a vessel cover, said seat being omitted at the portion of the wall opposite to the outlet, and the latter being formed by a spout projecting exteriorly from the surface of the wall.

4. A cooking vessel having a transverse pivotally connected supporting bail, and in diametrically opposite positions, an outlet and a handle arranged in a plane perpendicular to the axis of the supporting bail, the upper edge or rim of the vessel above the outlet and extending rearwardly at the sides of said rim being provided with a seat for the reception of the peripheral edge of a vessel cover, said seat being formed by an inwardly directed flange for overhanging and securing the cover in close contact with the edge or rim of the vessel.

5. A cooking vessel having a transverse pivotally connected supporting bail, and in diametrically opposite positions, an outlet and a handle arranged in a plane perpendicular to the axis of the supporting bail, the upper edge or rim of the vessel above the outlet and extending rearwardly at the sides of said rim being provided with a seat for the reception of the peripheral edge of a vessel cover, said outlet consisting of an outwardly extending spout provided in the plane of the wall of the vessel with a straining screen.

In testimony whereof I affix my signature in presence of two witnesses.

MABEL L. THOMPSON.

Witnesses:
REBECCA G. WOODS,
HARRY WINKLER.